(12) United States Patent
Collin et al.

(10) Patent No.: US 9,303,516 B2
(45) Date of Patent: Apr. 5, 2016

(54) MOVABLE BLADE FOR A TURBOMACHINE

(75) Inventors: Yannick Collin, Saint Maur des Fosses (FR); Thomas Lardellier, Paris (FR); David Mathieu, Chelles (FR); Denis Trahot, Herblay (FR); Christophe Remy, St Georges (BE); Xavier Godfrind, Ottignies (BE)

(73) Assignee: SNECMA, Paris (FR)

( * ) Notice: Subject to any disclaimer, the term of this patent is extended or adjusted under 35 U.S.C. 154(b) by 516 days.

(21) Appl. No.: 13/988,452

(22) PCT Filed: Nov. 21, 2011

(86) PCT No.: PCT/FR2011/052709
§ 371 (c)(1),
(2), (4) Date: May 20, 2013

(87) PCT Pub. No.: WO2012/069744
PCT Pub. Date: May 31, 2012

(65) Prior Publication Data
US 2013/0259699 A1  Oct. 3, 2013

(30) Foreign Application Priority Data
Nov. 22, 2010 (FR) ..................... 10 59573

(51) Int. Cl.
*F01D 5/14* (2006.01)
*F01D 5/22* (2006.01)
*F01D 5/16* (2006.01)

(52) U.S. Cl.
CPC ............... *F01D 5/147* (2013.01); *F01D 5/225* (2013.01); *Y02T 50/671* (2013.01)

(58) Field of Classification Search
CPC ....................................................... F01D 25/06

USPC .......................................................... 416/192
See application file for complete search history.

(56) References Cited

U.S. PATENT DOCUMENTS 5,154,581 A * 10/1992 Borufka .................. F01D 5/225
  415/173.6
5,971,710 A * 10/1999 Stauffer .................. B23P 6/002
  415/118

(Continued)

FOREIGN PATENT DOCUMENTS

EP    1 890 008    2/2008
FR    2 923 524    5/2009

(Continued)

OTHER PUBLICATIONS

International Search Report issued Jan. 31, 2012 in PCT/FR11/052709 filed Nov. 21, 2011.

(Continued)

*Primary Examiner* — Edward Look
*Assistant Examiner* — Jason Davis
(74) *Attorney, Agent, or Firm* — Oblon, McClelland, Maier & Neustadt, L.L.P.

(57) ABSTRACT

A movable blade for a turbomachine, the blade including at its distal end a top portion including opposite first and second side edges and upstream and downstream sealing wipers. Each of the first and second side edges has a substantially Z-shaped profile between the upstream and downstream wipers. On a side of the first side edge, the platform includes a first outwardly projecting rim not connected to either of the upstream and downstream wipers. The platform includes a second outwardly projecting rim, the second rim including a downstream portion connected to the downstream wiper and extending along the second edge, and an upstream portion extending the downstream portion as far as the upstream wiper, and set back relative to the second side edge.

5 Claims, 1 Drawing Sheet

(56) References Cited

U.S. PATENT DOCUMENTS

| | | | | |
|---|---|---|---|---|
| 6,164,916 | A * | 12/2000 | Frost | B23K 35/3046 148/528 |
| 6,179,567 | B1 * | 1/2001 | Stauffer | B23C 3/28 416/191 |
| 7,001,152 | B2 * | 2/2006 | Paquet | F01D 5/225 29/889.21 |
| 7,527,477 | B2 * | 5/2009 | Norton | F01D 5/225 29/889.2 |
| 7,762,779 | B2 * | 7/2010 | Zemitis | F01D 5/225 415/173.4 |
| 8,047,793 | B2 * | 11/2011 | Baumas | F01D 5/147 416/191 |
| 2008/0025841 | A1 | 1/2008 | Norton et al. | |
| 2009/0097979 | A1 | 4/2009 | Erdmann et al. | |
| 2009/0123288 | A1 | 5/2009 | Baumas et al. | |

FOREIGN PATENT DOCUMENTS

| | | |
|---|---|---|
| GB | 2 451 568 | 2/2009 |
| JP | 7-253001 A | 10/1995 |
| JP | 2002-129901 A | 5/2002 |
| JP | 2005-207294 A | 8/2005 |

OTHER PUBLICATIONS

Office Action issued Sep. 15, 2015 in Japanese Patent Application No. 2013-539320 (with English language translation).

* cited by examiner

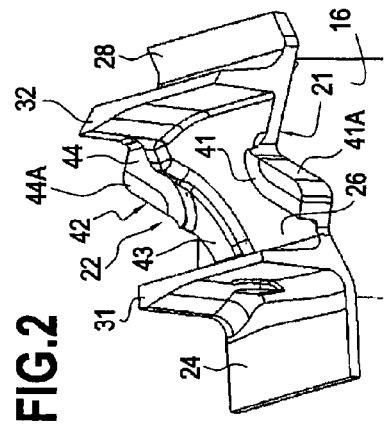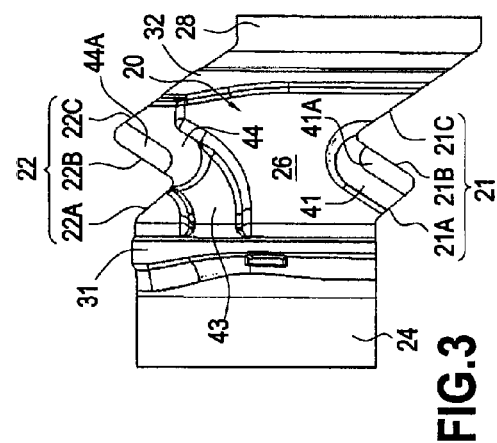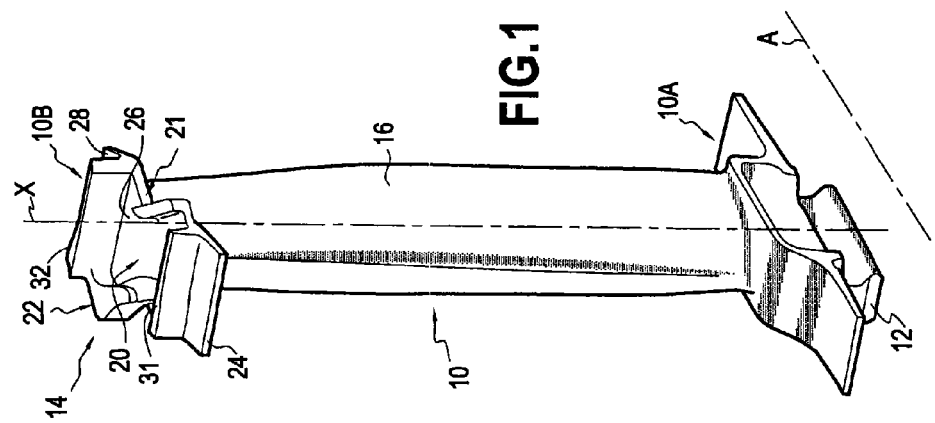

MOVABLE BLADE FOR A TURBOMACHINE

FIELD OF THE INVENTION

The present specification relates to a movable blade for a turbomachine.

Such a blade may be fitted to any type of turbomachine, for terrestrial or aviation use, and in particular to a helicopter turboshaft engine or to an airplane turbojet.

STATE OF THE ART

In the present specification, "upstream" and "downstream" are defined relative to the normal flow direction of gas (from upstream to downstream) through the turbomachine.

The axis of rotation of the rotor of the turbomachine is also referred to as the axis of the turbine or of the engine. The axial direction corresponds to the direction of the axis of the engine, and a radial direction is a direction perpendicular to the axis of the engine and intersecting said axis.

Likewise, an axial plane is a plane containing the axis of the engine, and a radial plane is a plane perpendicular to that axis.

Unless specified to the contrary, the adjectives "inner" and "outer" are used relative to a radial direction such that the inner portion of an element is the portion in a radial direction that is closer to the axis of the engine than an outer portion of the same element.

Finally, the stacking axis of a blade is defined as the axis passing through the center of gravity of the bottom section of the airfoil (i.e. the section closest to the axis of the engine) and perpendicular to the axis of the engine.

Typically, a movable blade of a turbomachine has an airfoil that extends along the stacking axis of the blade between proximal and distal ends (i.e. inner and outer ends) of the blade. At its proximal end, the blade has a root whereby it is fastened to a rotor disk of the engine. At its distal or free end, the blade has a transverse element referred to as a top portion. When a plurality of movable blades are fastened to a rotor disk, their top portions are arranged side by side so as to form a circumferential ring that serves, in particular, to define the outside of the flow passage for gas passing through the engine, and thus to limit gas leaks at that location.

The present specification relates to a movable blade having a top portion, the top portion comprising: a platform defining the outer surface of the passage for gas passing through the engine and having opposite first and second side edges; and upstream and downstream sealing wipers extending radially outwards from said platform.

In addition, the movable blade is such that each of the first and second side edges of the platform has a substantially Z-shaped profile between the upstream and downstream wipers, with a first segment close to the upstream wiper, an intermediate second segment, and a third segment close to the downstream wiper, the first and third segments being substantially parallel to each other, and the second segment extending substantially obliquely between the first and third segments.

In order to damp the vibration to which blades of the above-specified type are subjected in operation, the blades are installed on their rotor disks with twisting stress about their stacking axes. Thus, the top portions are designed so that each blade can be put under twisting stress by bearing against its neighbors, mainly along said second segments of the side edges.

In order to improve the bearing forces between the blades, and in particular in order to avoid the top portions overlapping so as to ensure that forces are transmitted as well as possible from each blade to its neighbors, it is known to increase the height, i.e. the dimension in the radial direction, of the side edges of the top portion, in particular in said second segments.

In a first known example of an top portion of a movable blade, the central portion of the platform that extends between the upstream and downstream wipers is made up of two subportions of different thicknesses: a first subportion of greater thickness extending axially from the upstream wiper to the third segments of the side edges, and circumferentially from the first side edge to the second side edge, and a second subportion of smaller thickness extending axially, after the first subportion, to the downstream wiper and circumferentially from the first side edge to the second side edge. The main drawback of that platform configuration is that it is heavy because of the thicker first subportion, said subportion being "solid", i.e. not being hollowed out.

In order to mitigate that drawback, in a second known example of a top portion, said first subportion is replaced by two rims projecting from the outside face of the platform and situated along the side edges of the platform. Like said first subportion of the platform, those rims extend from the upstream wiper to the third segments of the side edges, i.e. they do not join the downstream wiper. Nevertheless, in the circumferential direction, those rims are spaced apart by a cavity. It is that cavity that serves to lighten the top portion.

That second known example of a platform is nevertheless not free from drawbacks. In particular, one drawback lies in the center of gravity of the platform not being in alignment with the center of gravity of the top section of the airfoil, where the "top section" is the section of the airfoil immediately under the top portion. This non-alignment leads to extra stresses being exerted by the top portion on the remainder of the blade, with these extra stresses being detrimental to the lifetime of the blade. It should be observed that the first example of a known top portion as described above also has this drawback.

SUMMARY OF THE INVENTION

The present specification provides a movable blade for a turbomachine, the blade having at its distal end a top portion comprising: a platform defining the outside surface of the passage for gas passing through the turbomachine, and having opposite first and second side edges; and upstream and downstream sealing wipers extending radially outwards from said platform. Each of the first and second side edges has a substantially Z-shaped profile between the upstream and downstream wipers, which profile has a first segment close to the upstream wiper, an intermediate second segment, and a third segment close to the downstream wiper, the first and third segments being substantially parallel to each other, and the second segment extending obliquely between the first and third segments. The top portion includes, on the side of the first side edge, a first outwardly projecting rim extending along the second segment of the first side edge, this first rim not being connected to either of the upstream and downstream wipers; and the top portion includes, on the side of the second side edge, a second outwardly projecting rim, the second rim having a downstream portion connected to the downstream wiper and extending along the second and third segments of the second side edge, and an upstream portion extending the downstream portion as far as the upstream wiper, being set back relative to the first segment of the second side edge (i.e. relative to the first segment of the second side edge, the upstream portion is offset towards the middle of the platform).

In certain embodiments, the height of the upstream portion of the second rim is less than the height of the downstream portion.

The top portion of such a blade has the advantage of having limited weight in comparison with the above-described first known example of a top portion.

In addition, the positioning and the configuration of the rims makes it possible to provide a top portion with a center of gravity that is close to or even in alignment with the center of gravity of the top section of the airfoil. This serves to limit or even avoid the extra stresses exerted by the top portion on the remainder of the blade.

Finally, compared with both the above-mentioned known examples of top portions, since the second rim is connected to the downstream wiper, the downstream wiper is stiffened, thus enabling contact forces between adjacent platforms to be withstood better.

In an embodiment, the material constituting the blade is generally not good at withstanding wear under the operating conditions of the turbomachine, and in order to lengthen the lifetime of the blade, the sensitive portions of the blade are protected by applying some other material thereto that is better at withstanding wear, commonly referred to as an anti-wear material.

Thus, in an embodiment, each of the first and second rims carries a layer of anti-wear material on its side face.

This layer of anti-wear material serves to protect the rims of the platform of the blade against the wear that results from rubbing against the neighboring blades. Since the portions of the rims that are situated along said second segments of the side edges of the blade are the most exposed to friction, it is advantageous for protection to be given to them as a priority. Thus, in an embodiment, said layer of anti-wear material is present at least on said second segments.

Said layer of anti-wear material may be made in various ways. It may comprise small plates of a specific alloy having high hardness and suitable for being brazed to the metal rim, i.e. the substrate, at the surfaces that bear against the neighboring blades. In another technique, the surface that needs protecting is progressively built-up with an anti-wear material that is melted at the same time as the top layer of the substrate (possibly after locally milling away a determined thickness of the material of the substrate). Heat is delivered by means of a suitable heat source. By way of example, this may be an electric arc in an inert gas or a laser beam. In this other technique, the anti-wear material used is a cobalt-based alloy, where some such alloys are sold under the trademark "Stellite".

The present specification also provides a turbomachine including a blade.

BRIEF DESCRIPTION OF THE DRAWINGS

The accompanying drawings are diagrammatic and not necessarily to scale, seeking essentially to illustrate the principles of the invention.

In the drawings, from one figure to another, elements (or portions of an element) that are identical are identified by the same reference signs.

FIG. 1 is a perspective view showing an example of a movable blade having a top portion.

FIG. 2 is a detailed view of the top portion of the FIG. 1 blade.

FIG. 3 is a plan view of the top portion of FIG. 2.

DETAILED DESCRIPTION OF EMBODIMENT(S)

An embodiment of a movable blade with a top portion is described in detail below with reference to the accompanying drawings. This example illustrates the features and the advantages of the invention. It should nevertheless be recalled that the invention is not limited to this example.

FIG. 1 shows an example of a movable blade 10 of a turbomachine. Such a blade may be used in a low pressure stage of an airplane turbojet.

The movable blade 10 has an airfoil 16 that extends along the stacking axis X of the blade between a proximal end 10A and a distal end 10B (i.e. an inner end and an outer end) of the blade. At its proximal end 10A, the blade has a root 12 used for fastening it to a rotor disk of the turbomachine (not shown). The disk rotates about the axis A of the engine. At its outer end 10B, the blade 10 has a top portion 14.

When a plurality of movable blades 10 are fastened to a rotor disk, their top portions 14 are arranged side by side so as to form a rotary ring defining a surface of revolution around the axis of rotation A of the disk.

The ring has a particular function of defining the outer surface of the flow passage for gas passing between the airfoils 16, and thus a function of limiting any leakage of gas at the distal ends 10B of the blades 10.

The top portion 14 comprises: a platform 20 defining the outside of the flow passage for gas passing between the airfoils 16 and having opposite first and second side edges 21 and 22; and upstream and downstream sealing wipers 31 and 32 extending radially outwards from the platform 20.

When a plurality of movable blades 10 are fastened to a rotor disk, the upstream and downstream wipers of the blades are arranged edge to edge so as to form a rotary ring of axis A, this ring being contained substantially in a radial plane. Such a ring has in particular the function of limiting the clearance that exists between the blades 10 and the cover or casing that surrounds the blades in order to limit gas leaks at that location.

The platform 20 has an upstream portion 24 referred to as an "upstream overhang" that extends upstream from the upstream wiper 31. The platform 20 also has a downstream portion 28 referred to as a "downstream overhang" that extends downstream from the downstream wiper 32. Finally, the platform has a central portion 26 that extends between the upstream and downstream wipers 31 and 32.

As can be seen clearly in FIG. 3, in the central portion 26, each of the first and second side edges 21 (22) of the platform 20 has a substantially Z-shaped profile with a first segment 21A (22A) close to the upstream wiper 31, an intermediate second segment 21B (22B), and a third segment 21C (22C) close to the downstream wiper 32, the first and third segments 21A, 21C (22A, 22C) of the edge 21 (22) being substantially parallel to each another, and the second segment 21B (22B) extending substantially obliquely between the first and third segments 21A, 21C (22A, 22C).

In order to damp the vibration to which the blades 10 are subjected in operation, the blades 10 are mounted on the rotor disk (not shown) with twisting stress about their stacking axes X. Thus, the platforms 20 of the top portions 14 are of a shape such that each blade 10 can be put under twisting stress by pressing against its neighbors, mainly along the second segments 21B, 22B of the side edges 21, 22.

On the side of the first side edge 21, the top portion 14 of the blade 10 has a first outwardly projecting rim 41 that extends along the second segment 21B of the first side edge 21. This first rim 41 is connected neither to the upstream wiper 31 nor to the downstream wiper 32.

In this example, the first rim 41 extends essentially along the second segment 21B. More precisely, it does not extend along the third segment 21C of the first side edge 21 and it extends in part only along the first segment 21A.

In the example shown, the first rim 41 has a layer of anti-wear material 41A on its side face along the second segment 21B, which layer is obtained by building up this side face with a cobalt-based alloy of the type sold under the trademark "Stellite" and having good anti-wear properties.

On the side of its second side edge 22, the top portion 14 also has a second outwardly projecting rim 42 having a downstream portion 44 connected to the downstream wiper 32 and extending along the second and third segments 22B and 22C of the second side edge 22. Like the first rim 41, this downstream portion 44 has a layer of anti-wear material 44A on its side face along the second segment 22B, this layer being obtained by building up this side face with a cobalt-based alloy having good anti-wear properties. It should be observed that unlike the first rim 41, the downstream portion 44 is connected to a wiper, specifically the downstream wiper 32.

Furthermore, the second rim 42 includes an upstream portion 43 extending the downstream portion 44 as far as the upstream wiper 31, and set back relative to the first segment 22A of the second side edge 22. In other words, the upstream portion 43 does not run along the first segment 22A of the second side edge 22, but rather it is set back from said first segment 22A in the sense that the upstream portion 43 is closer to the middle of the central portion 26 of the platform. In this example, the upstream portion 43 extends firstly in line with the downstream portion 44 so as to extend initially progressively away from the first segment 22A. Compared with the first segment 22A, the upstream portion 43 thus begins by being progressively offset towards the middle of the central portion 26 of the platform. Thereafter, the upstream portion 43 curves and comes a little closer to the first segment 22A while remaining clearly set back (i.e. offset) from the first segment 22A.

In the example shown, the upstream portion 43 begins by extending in line with the downstream portion 44, i.e. in the direction of the second segment 22B, and then it curves so as to join the upstream wiper 31 substantially orthogonally. The upstream portion 43 thus defines a convex side facing towards the first rim 41.

As can be seen clearly in FIG. 2, the upstream portion 43 is of smaller height than the downstream portion 44, so there is a kind of step between these portions 43 and 44.

In the example shown, the first and second rims 41 and 42 are of substantially the same width, the upstream and downstream portions 43 and 44 of the second rim 42 likewise being of substantially the same width. In addition, the first rim 41 and the downstream portion 44 of the second rim 42 are of substantially the same height.

As shown, the first rim 41, the second rim 42, the upstream wiper 31, and the downstream wiper 32 define between them a cavity, that may be referred to as a "bathtub", with a substantially flat bottom that is formed by the outside surface of the central portion 26 of the platform 20.

The invention claimed is:

1. A movable blade for a turbomachine, the blade comprising at its distal end a top portion comprising:
   a platform defining an outside surface of a passage for gas passing through the turbomachine, and opposite first and second side edges; and
   upstream and downstream sealing wipers extending radially outwards from the platform;
   wherein each of the first and second side edges includes a substantially Z-shaped profile between the upstream and downstream wipers, which profile includes a first segment closer to the upstream wiper, an intermediate second segment, and a third segment closer to the downstream wiper, the first and third segments being substantially parallel to each other, and the second segment extending obliquely between the first and third segments;
   wherein the top portion includes, on a side of the first side edge, a first outwardly projecting rim that extends along the second segment of the first side edge, the first rim not being connected to either of the upstream and downstream wipers; and
   the top portion includes, on a side of the second side edge, a second outwardly projecting rim, the second rim having a downstream portion connected to the downstream wiper and extending along the second and third segments of the second side edge, and an upstream portion extending the downstream portion as far as the upstream wiper, being set back relative to the first segment of the second side edge.

2. A blade according to claim 1, wherein each of the first and second rims includes a layer of anti-wear material on its side face.

3. A blade according to claim 2, wherein a height of the upstream portion of the second rim is less than a height of the downstream portion.

4. A blade according to claim 1, wherein a height of the upstream portion of the second rim is less than a height of the downstream portion.

5. A turbomachine comprising a blade according to claim 1.

* * * * *